(12) United States Patent
Mori et al.

(10) Patent No.: US 10,591,884 B2
(45) Date of Patent: Mar. 17, 2020

(54) CONTROLLER AND CONTROL PROGRAM UPDATING METHOD

(71) Applicant: DENSO TEN Limited, Kobe-shi, Hyogo (JP)

(72) Inventors: Naoto Mori, Kobe (JP); Shigeto Umeyama, Kobe (JP)

(73) Assignee: DENSO TEN LIMITED, Kobe-shi (JP)

( * ) Notice: Subject to any disclaimer, the term of this patent is extended or adjusted under 35 U.S.C. 154(b) by 149 days.

(21) Appl. No.: 15/837,208

(22) Filed: Dec. 11, 2017

(65) Prior Publication Data
US 2018/0231948 A1  Aug. 16, 2018

(30) Foreign Application Priority Data

Feb. 15, 2017 (JP) .................................. 2017-026330

(51) Int. Cl.
| | |
|---|---|
| *G06F 11/30* | (2006.01) |
| *G05B 19/042* | (2006.01) |
| *G06F 11/34* | (2006.01) |
| *G06F 8/65* | (2018.01) |
| *G05B 23/02* | (2006.01) |
| *G06F 11/07* | (2006.01) |

(52) U.S. Cl.
CPC ..... *G05B 19/0426* (2013.01); *G05B 23/0208* (2013.01); *G05B 23/0297* (2013.01); *G06F 8/65* (2013.01); *G06F 11/0739* (2013.01); *G06F 11/0757* (2013.01); *G06F 11/3024* (2013.01); *G06F 11/3419* (2013.01); *G05B 2219/24015* (2013.01); *G05B 2219/25064* (2013.01); *G05B 2219/2637* (2013.01)

(58) Field of Classification Search
CPC ............. G06F 11/0757; G06F 11/0703; G06F 11/0721; G06F 11/0733; G06F 11/0751; G06F 11/3024; G06F 11/3419; G05B 19/0428; G05B 19/25158
See application file for complete search history.

(56) References Cited

U.S. PATENT DOCUMENTS

| | | | |
|---|---|---|---|
| 7,107,488 B2* | 9/2006 | Hashimoto | G05B 19/0428 714/25 |
| 7,912,600 B2* | 3/2011 | Iwagami | F02D 41/22 701/32.8 |
| 8,234,035 B2* | 7/2012 | Iwagami | G05B 9/02 701/1 |

(Continued)

FOREIGN PATENT DOCUMENTS

JP  2015-108944 A  6/2015

*Primary Examiner* — Nadeem Iqbal
(74) *Attorney, Agent, or Firm* — Oliff PLC

(57) ABSTRACT

A controller according to an embodiment includes a main processing unit and a monitoring unit. The main processing unit executes a control program. The monitoring unit monitors the main processing unit by a first monitoring method for transmitting, to the main processing unit, a transmission content corresponding to a question and for evaluating an answer to the question from the main processing unit. The main processing unit causes, when receiving an updating request of the control program, the monitoring unit to perform switching from the first monitoring method into a second monitoring method for monitoring a watchdog signal of the main processing unit.

6 Claims, 7 Drawing Sheets

(56) References Cited

U.S. PATENT DOCUMENTS

| | | | |
|---|---|---|---|
| 9,830,211 B2* | 11/2017 | Pont ..................... | G06F 9/4887 |
| 9,914,474 B2* | 3/2018 | Kozuka ................ | B62D 5/0409 |
| 10,296,322 B2* | 5/2019 | Mori ..................... | G06F 8/65 |
| 2005/0033558 A1* | 2/2005 | Schwertfuehrer . | G05B 19/0428 |
| | | | 702/188 |
| 2009/0100287 A1* | 4/2009 | Chu .................... | G06F 11/0769 |
| | | | 714/2 |
| 2009/0138137 A1* | 5/2009 | Iwagami ............... | G05B 9/02 |
| | | | 701/1 |

* cited by examiner

CONTROLLER AND CONTROL PROGRAM UPDATING METHOD

CROSS-REFERENCE TO RELATED APPLICATION

This application is based upon and claims the benefit of priority of the prior Japanese Patent Application No. 2017-026330, filed on Feb. 15, 2017, the entire contents of which are incorporated herein by reference.

FIELD

The embodiment discussed herein is directed to a controller and a control program updating method.

BACKGROUND

Conventionally, there is known Electronic Control Units (ECUs) that are provided in a vehicle so as to electronically control respective various systems of the vehicle, such as an engine, a transmission, and a car navigation device. In each of these controllers, a built-in microcontroller (hereinafter, may be referred to as "microcomputer") executes a control program so as to realize assigned various functions.

In this controller, for example, a power source Integrated Circuit (power source IC) functions as a monitoring unit for monitoring whether or not the microcomputer normally operates. There is conventionally known, as a microcomputer monitoring system, a watchdog counter (hereinafter, may be referred to as "WDC") monitoring system for monitoring an interval between pulses of a WDC signal that is output from the microcomputer, for example.

There is also proposed, as another microcomputer monitoring system, a Q&A system using serial communication (see Japanese Laid-open Patent Publication No. 2015-108944, for example). In the Q&A system, a monitor IC periodically transmits, to a microcomputer, random data and an arithmetic-operation instruction etc. corresponding to "question". The microcomputer arithmetically operates the random data caused by a specific arithmetic-operation instruction, and transmits the arithmetic-operation result to the monitor IC as "answer".

When the answer of the microcomputer does not return at a defined communication timing or when the answer is evaluated not to be an expected one, the monitor IC determines that an operation abnormality occurs in the microcomputer and hard-resets the microcomputer by using power source control, for example.

There exists, in some cases, a case where such a control program of the controller is to be updated (reprogrammed) when a function is added thereto, or when an abnormality is found out after the fact. At the time of this updating in the microcomputer, a control program is temporarily stopped for the updating and an updating program is started so as to rewrite the control program.

However, the above conventional technology has room for improvement in preventing an erroneous reset performed by a monitoring unit in updating a control program.

Specifically, at the time of updating a control program, the microcomputer once stops the control program and performs program shifting for starting an updating program instead thereof, as described above, it is preferable that the microcomputer monitoring performed by the monitoring unit is to be continued so that an incorrect state, such as hang-up, is able to be detected even during the program shifting.

In this point, the updating program is able to answer to the monitoring unit instead of the control program so as to continue the microcomputer monitoring, however, processing load on the microcomputer side increases during the program shifting, for example, and thus disturbance is easily caused in a communication timing between the monitoring unit and the microcomputer etc.

When the above Q&A system is employed, the communication timing is more easily disturbed because the communication timing between the question and the answer is finely defined and further the serial communication having a comparatively low speed is employed. Thus, there exists a fear that this disturbance in the communication timing causes the monitoring unit to erroneously reset the microcomputer.

SUMMARY

A controller according to an aspect of an embodiment includes a main processing unit and a monitoring unit. The main processing unit executes a control program. The monitoring unit monitors the main processing unit by a first monitoring method for transmitting, to the main processing unit, a transmission content corresponding to a question and for evaluating an answer to the question from the main processing unit. The main processing unit causes, when receiving an updating request of the control program, the monitoring unit to perform switching from the first monitoring method into a second monitoring method for monitoring a watchdog signal of the main processing unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an exemplary embodiment of a controller and a control program updating method disclosed in the present application will be described in detail with reference to the accompanying drawings. Moreover, it is not intended that the present disclosure be limited to the embodiment described below.

Hereinafter, the outline of a control program updating method according to the present embodiment will be explained with reference to FIGS. 1A to 1E, next, an Electronic Control Unit (ECU) 10 (corresponding to one example of "controller") to which the control program updating method according to the present embodiment is to be applied will be explained with reference to FIGS. 2 to 4.

Figure 1A:
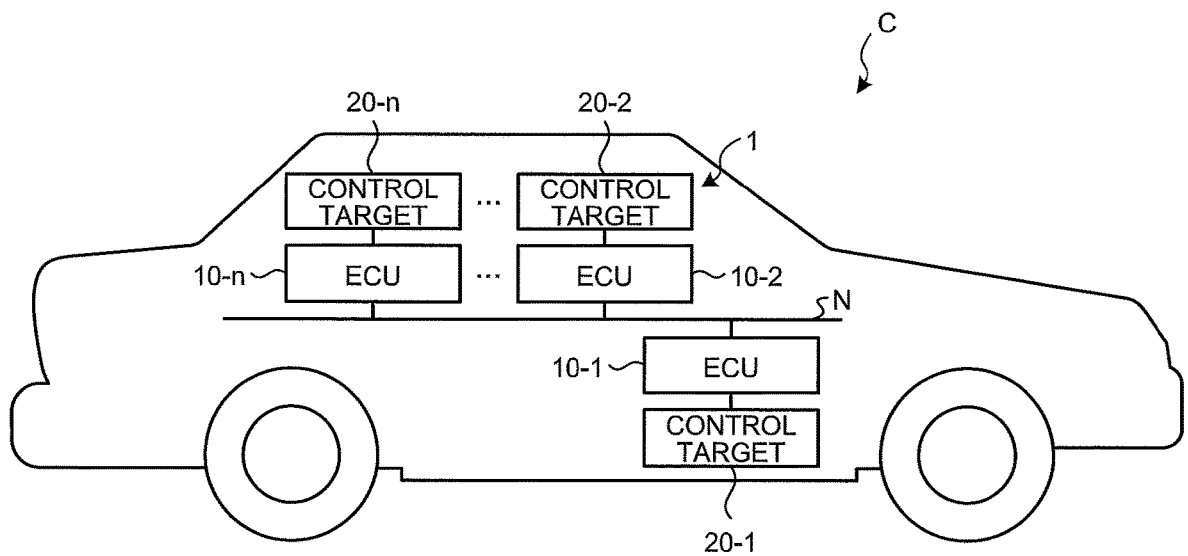
FIG. 1A is a diagram illustrating the outline of an on-vehicle system.
Figure 1B:
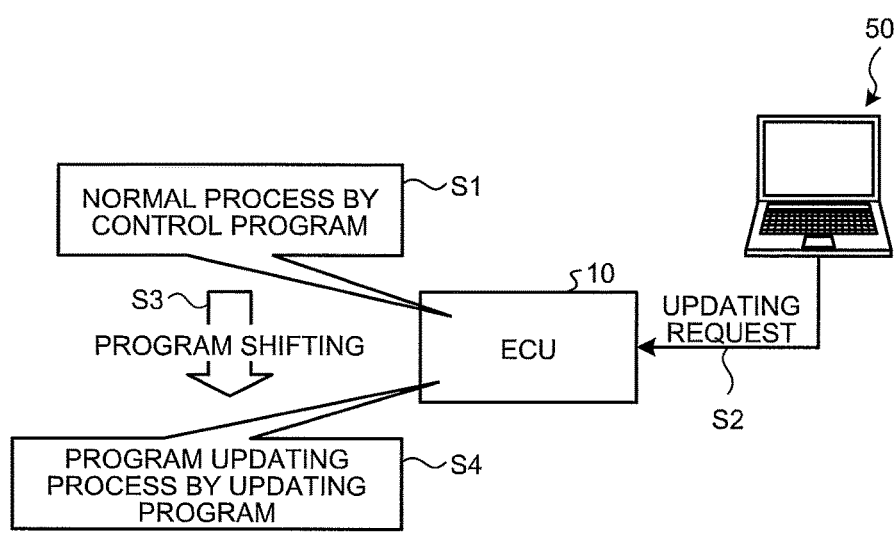
FIG. 1B is a diagram illustrating the outline of reprogramming.
Figure 1C:
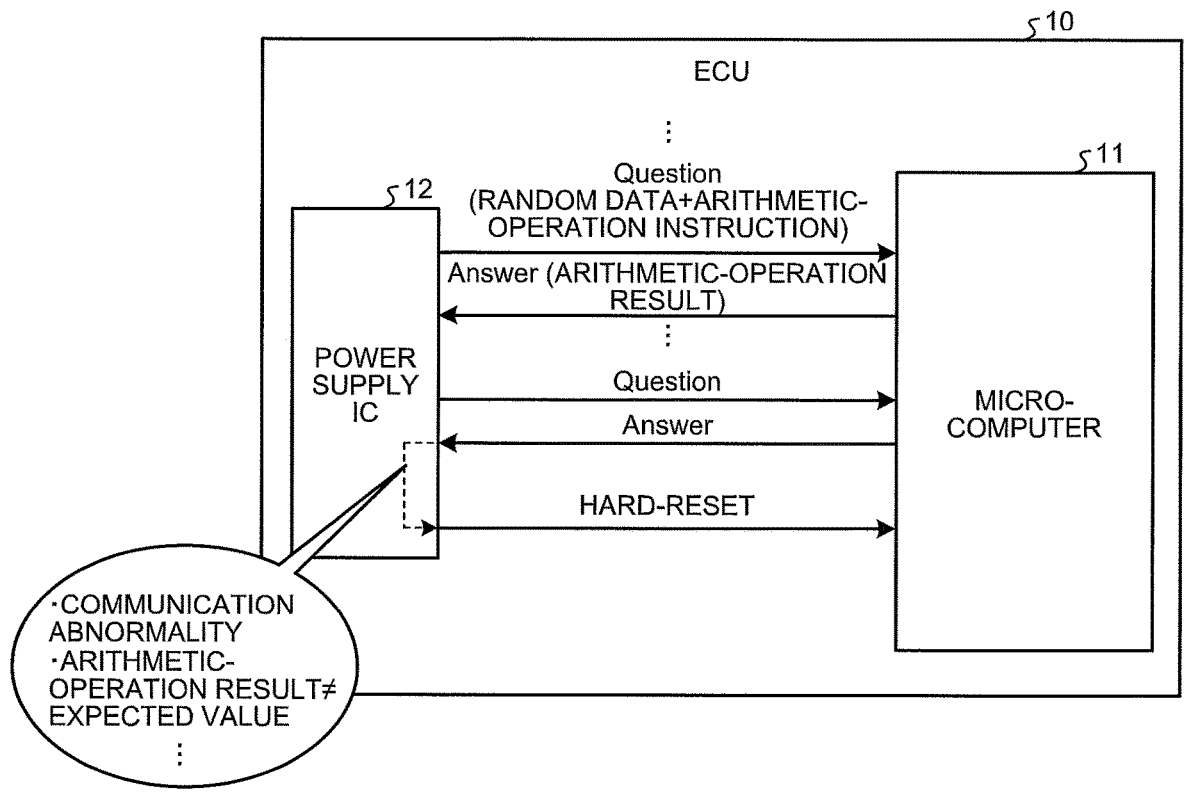
FIG. 1C is a diagram illustrating the outline of a question and answer (Q&A) system.
Figure 1D:
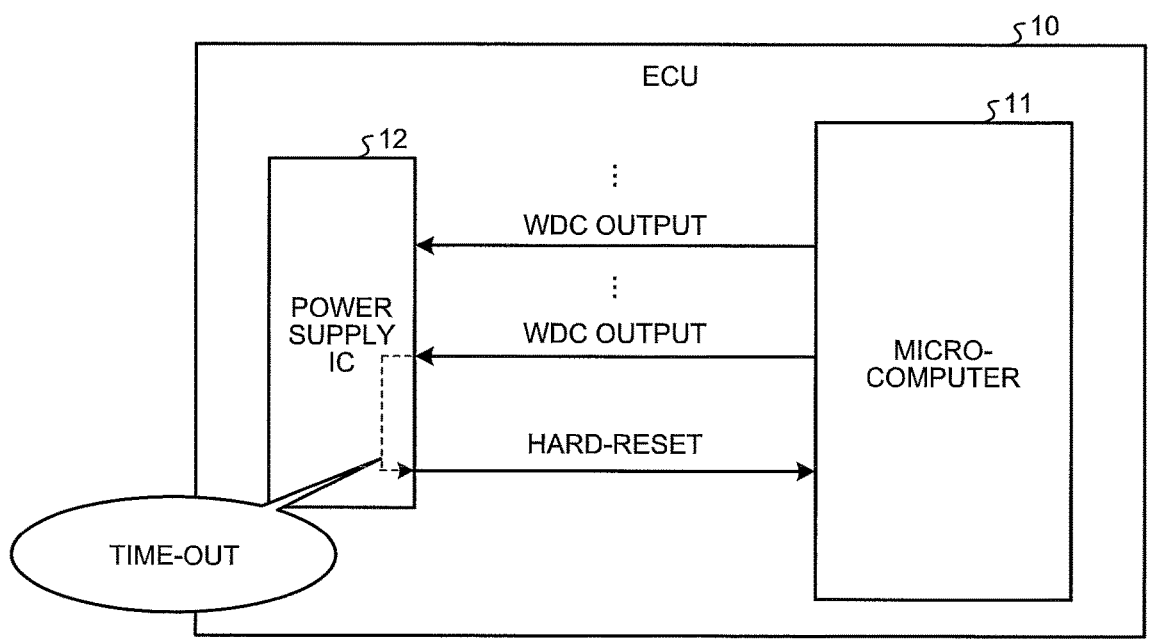
FIG. 1D is a diagram illustrating the outline of a watchdog counter (WDC) monitoring system.
Figure 1E:
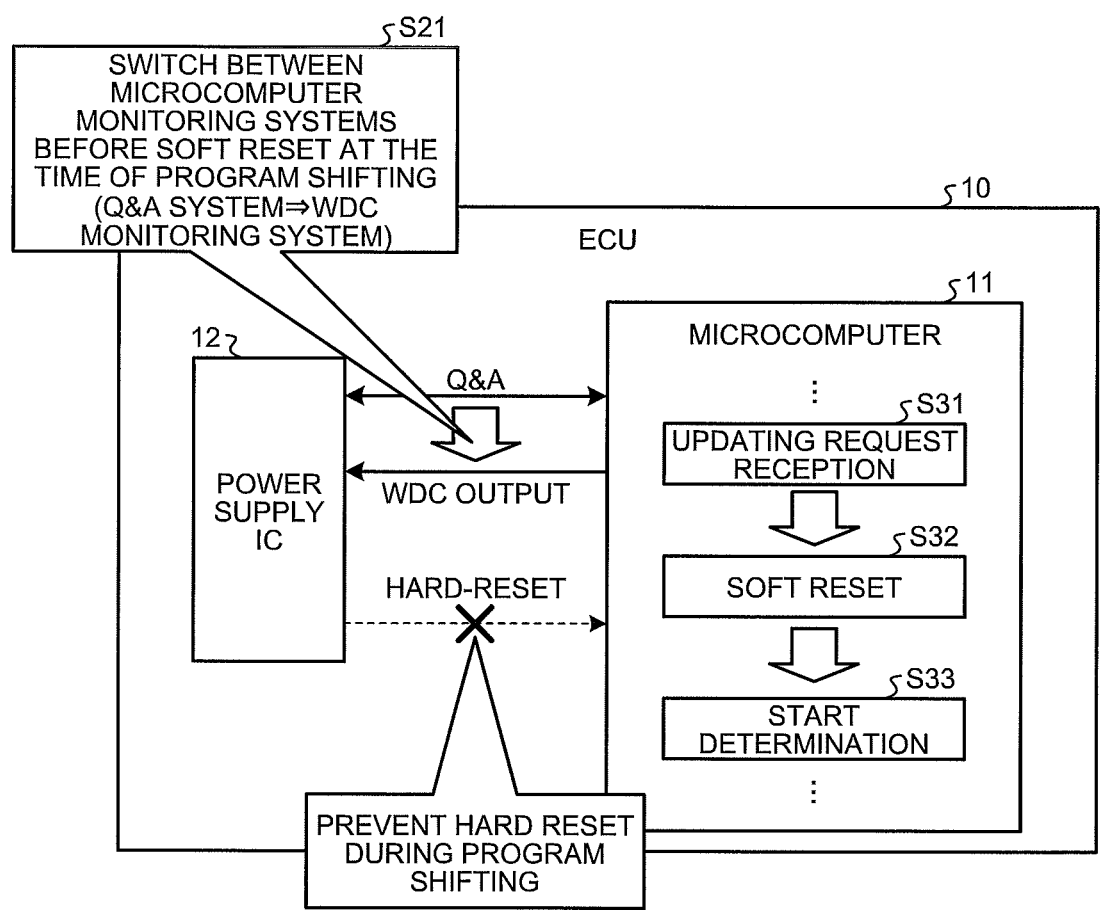
FIG. 1E is a diagram illustrating the outline of a control program updating method according to an embodiment.

First, the outline of the control program updating method according to the present embodiment will be explained with reference to FIGS. 1A to 1E. FIG. 1A is a diagram illustrating the outline of an on-vehicle system 1. FIG. 1B is a diagram illustrating the outline of reprogramming. FIG. 1C is a diagram illustrating the outline of a question and answer (Q&A) system. FIG. 1D is a diagram illustrating the outline of a watchdog counter (WDC) monitoring system. FIG. 1E is a diagram illustrating the outline of a control program updating method according to the present embodiment.

As illustrated in FIG. 1A, a vehicle C includes the on-vehicle system 1. The on-vehicle system 1 includes ECUs 10-1 to 10-n. The ECUs 10-1 to 10-n are connected with one another by a network N, such as a Controller Area Network (CAN), in a communicable manner so as to electronically control respective control targets 20-1 to 20-n by executing control programs. The control targets 20-1 to 20-n include various systems such as an engine, a transmission, and a car navigation device.

There exists a case where a control program executed by each of the ECUs 10 is to be updated when a function is to be added thereto, or when an abnormality is found out after the fact. In this case, as illustrated in FIG. 1B, an updating terminal 50 is connected to the ECU 10 to be updated through the CAN etc., and reprogramming is performed thereon.

At the time of the reprogramming, a power supply of the ECU 10 is first turned on to start a control program, and the ECU 10 is turned into a state where a normal process is executed by this control program (Step S1).

In this state, when an updating request is transmitted from the updating terminal 50 by command input etc. (Step S2), program shifting for starting an updating program, instead of the control program, is to be performed in the ECU 10 that has received this updating request (Step S3). When the updating program is started, the ECU 10 executes a program updating process by using the updating program (Step S4).

Meanwhile, the ECU 10 includes a monitoring unit that monitors whether or not a microcomputer 11 normally operates and, when detecting an operation abnormality, hard-resets the microcomputer 11 by OFF/ON of a power supply, for example.

As illustrated in FIG. 1C, the monitoring unit includes a power source Integrated Circuit (power source IC) 12, for example. There is known, as a microcomputer monitoring system, a question and answer (Q&A) system using the serial communication. There is also known, as another microcomputer monitoring system, a WDC monitoring system that monitors an interval between pulses of a WDC signal output from the microcomputer 11.

As illustrated in FIG. 1C, in the Q&A system, for example, random data and an arithmetic-operation instruction corresponding to a question are transmitted to the microcomputer 11 from the power supply IC 12.

The microcomputer 11 operates random data included in the question caused by an arithmetic-operation instruction that is additionally transmitted, and transmits an arithmetic-operation result to the power supply IC 12 as an answer. This exchange is periodically repeated.

When an answer of the microcomputer 11 does not return at the defined communication timing (see "communication abnormality" illustrated in FIG. 10) or when the answer is not the expected one (see "arithmetic-operation result≠expected value" illustrated in FIG. 10), the power supply IC 12 determines that an operation abnormality occurs in the microcomputer 11 so as to hard-reset the microcomputer 11, for example.

As illustrated in FIG. 1D, in the WDC monitoring system, the power supply IC 12 monitors an interval between pulses of a WDC signal that is periodically output from the microcomputer 11. The power supply IC 12 includes a watchdog timer (not illustrated: hereinafter, may be referred to as "WDT"), when determining "time-out" by using this WDT as illustrated in FIG. 1D, the power supply IC 12 determines that an operation abnormality occurs in the microcomputer 11 so as to hard-reset the microcomputer 11, for example.

It can be said that the Q&A system performs more specific monitoring than the WDC monitoring system because the evaluation performed by the Q&A system further includes the evaluation of the content of the answer, such as whether or not the answer is an expected one. The ECU 10 according to the present embodiment employs the Q&A system during execution of a normal process by a control program.

Meanwhile, it is preferable that the power supply IC 12 continues monitoring the microcomputer to be able to detect an incorrect state, such as hang-up, even during reprogramming that includes program shifting. Note that disturbance is easily caused in a communication timing between the power supply IC 12 and the microcomputer 11, etc. because processing load on the microcomputer 11 side increases during the program shifting.

Moreover, in a Q&A system, a communication sequence between a question and an answer, which includes a timing etc., is finely defined. Furthermore, serial communication having a comparatively low speed is employed, and thus it is assumed that the communication timing is more easily disturbed during the program shifting. When the communication timing is disturbed, there exists a fear that the microcomputer 11 is erroneously hard-reset by the power supply IC 12 during the program shifting, for example.

Therefore, as illustrated in FIG. 1E, in the control program updating method according to the present embodiment, a microcomputer monitoring system is to be switched, at the time of program shifting, from a Q&A system into a WDC monitoring system before a soft reset (Step S21). The soft reset is a restart method in a state where a device power source is held.

Specifically, in program shifting as illustrated in FIG. 1E, an updating request reception (Step S31) is performed, and then the microcomputer 11 is soft-reset that is a main processing unit of the ECU 10 (Step S32). The soft-reset and rebooted microcomputer 11 performs a start determination of an updating program (Step S33).

The control program updating method according to the present embodiment performs the above process of Step S21 after the updating request reception of Step S31 and before the soft reset of Step S32.

In other words, the control program updating method switches the microcomputer monitoring system into the WDC monitoring system that is defined more loosely than the Q&A system and whose communication sequence is simple and not likely to be disturbed, before the soft reset, not after the soft reset when a heavy processing load is inclined to be burdened and the disturbance in a communication timing is assumed to easily occur.

Thus, it is possible to reduce a risk in which the power supply IC 12 determines an operation abnormality during program shifting and to prevent a hard reset performed by the power supply IC 12 during program shifting as illustrated in FIG. 1E.

In the control program updating method according to the present embodiment, a WDC signal is pulse-output at least one time after the microcomputer monitoring system is switched into the WDC monitoring system to start WDC monitoring and before the soft reset (not illustrated).

Thus, it is possible to prevent a hard reset to be performed by the power source IC 12, which is due to an output delay of a WDC signal during the soft reset, in other words, during a reboot period of the microcomputer 11 in program shifting. This point will be mentioned later with reference to FIG. 3C.

Hereinafter, the ECU 10 to which the above control program updating method is applied will be explained more specifically.

Figure 2:
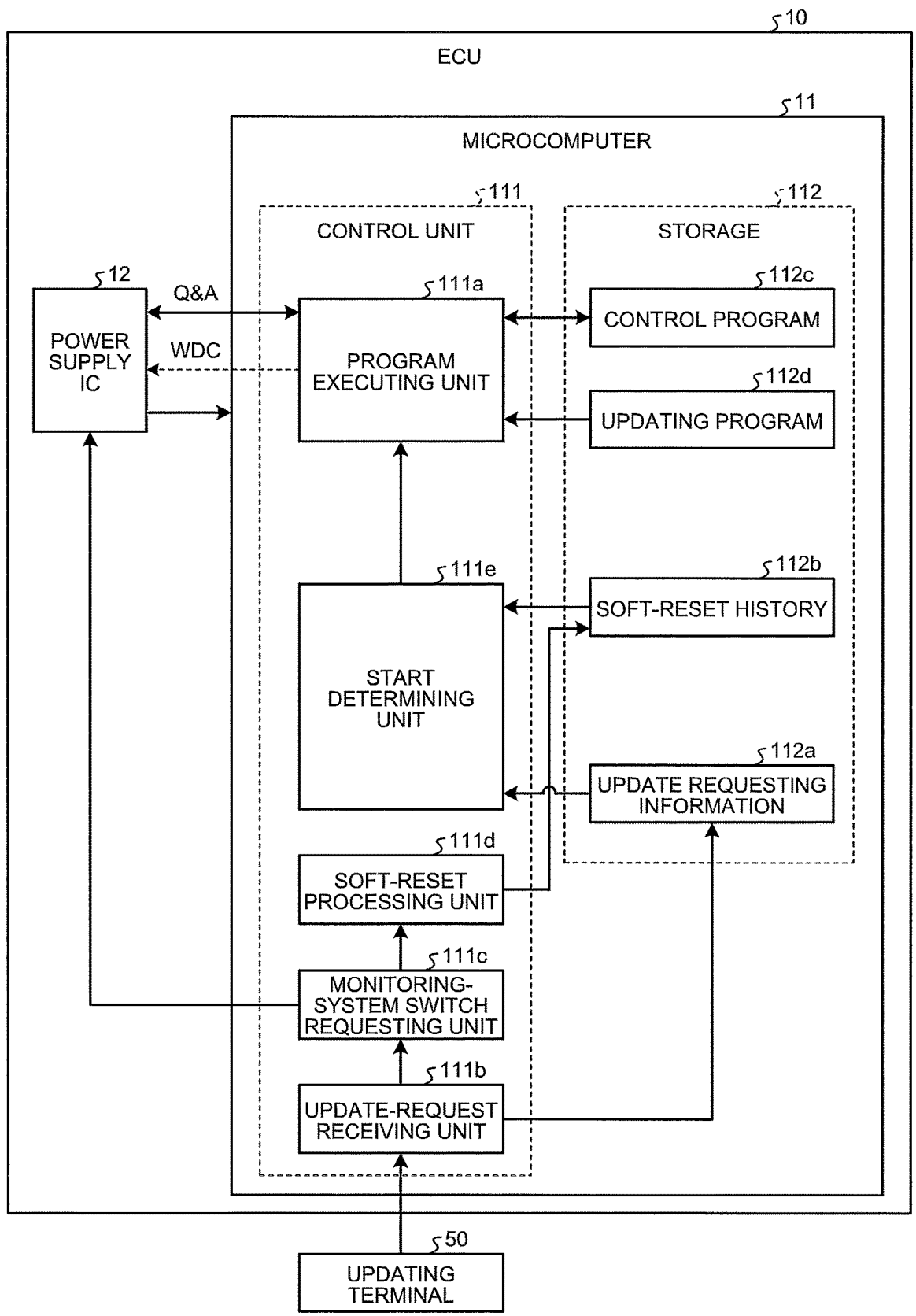
FIG. 2 is a block diagram illustrating an Electronic Control Unit (ECU) according to the embodiment.

FIG. 2 is a block diagram illustrating the ECU 10 according to the present embodiment. In FIG. 2, only configuration elements for explaining characteristics according to the present embodiment are illustrated by using function blocks, and description of common configuration elements is appropriately omitted.

In other words, each component of the corresponding apparatus illustrated in the drawings is functionally conceptual, and thus, does not always physically configured as illustrated in the drawings. Namely, a specific mode of separation or integration of each apparatus is not limited to that illustrated in the drawings. That is, all or some of the components can be configured by separating or integrating them functionally or physically in any unit, according to various types of loads, the status of use, etc.

As illustrated in FIG. 2, the ECU 10 includes the microcomputer 11 and the power supply IC 12. First, the power supply IC 12 will be explained. The power supply IC 12 monitors the microcomputer 11 in response to a monitoring-system switching request sent from the microcomputer 11 by using a Q&A system in normal processing and a WDC monitoring system in reprogramming. As a result of the monitoring, when the microcomputer 11 is in a state of an operation abnormality, the power supply IC 12 hard-resets the microcomputer 11 as needed.

The microcomputer 11 includes a control unit 111 and a storage 112. The control unit 111 includes a program executing unit 111a, an update-request receiving unit 111b, a monitoring-system switch requesting unit 111c, a soft-reset processing unit 111d, and a start determining unit 111e.

The storage 112 stores update requesting information 112a, a soft-reset history 112b, a control program 112c, and an updating program 112d. The update requesting information 112a is stored in a retention Random Access Memory (RAM) area of the storage 112, for example. The soft-reset history 112b is stored in a register of the storage 112, for example.

The retention RAM area includes a RAM area for holding information even when the microcomputer 11 is soft-reset, in other words, a RAM area that is able to hold information as long as a device power source is held, and includes a Static Random Access Memory (SRAM) constituted of flip-flop, for example. The register also includes a storage area that is constituted of flip-flop etc. and is able to hold information as long as a device power source is held.

The control unit 111 includes, for example, a Central Processing Unit (CPU) for controlling a whole of the microcomputer 11. The program executing unit 111a reads the control program 112c or the updating program 112d from the storage 112 and executes it, in response to a start instruction sent from the start determining unit 111e.

The program executing unit 111a reads and executes the control program 112c in normal processing so as to realize an electronic-control function assigned to the ECU 10. The program executing unit 111a reads and executes the updating program 112d in reprogramming and applies updating data to the control program 112c so as to rewrite the control program 112c.

The updating data (not illustrated) for the control program 112c is, for example, downloaded from a server device, installed from the updating terminal 50, or read through a portable storage medium, whereby the updating data is able to be applied to the microcomputer 11.

The program executing unit 111a executes a process according to a microcomputer monitoring system of the power supply IC 12, such as a process (hereinafter, may be referred to as "Q&A process") for operating and transmitting an answer of a question in a Q&A system and a process (hereinafter, may be referred to as "WDC outputting process") for pulse-outputting a WDC signal in a WDC monitoring system.

The update-request receiving unit 111b receives an updating request sent from the updating terminal 50. The update-request receiving unit 111b writes the update requesting information 112a indicating that the updating request is received. The update-request receiving unit 111b informs the monitoring-system switch requesting unit 111c that the updating request is received.

The monitoring-system switch requesting unit 111c transmits, to the power supply IC 12, a monitoring-system switching request for switching a microcomputer monitoring system from a Q&A system into a WDC monitoring system, on the basis of the information sent from the update-request receiving unit 111b.

Figure 3A:
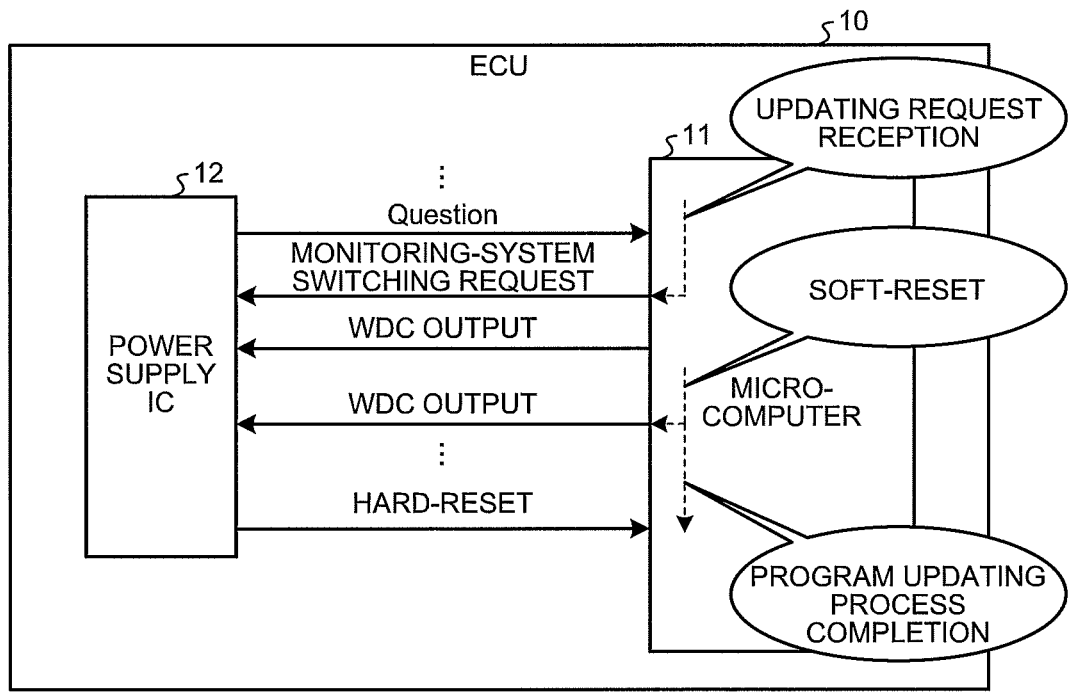
FIG. 3A is a diagram illustrating a monitoring-system switching sequence at the time of program shifting.

The switching between the monitoring methods at the time of program shifting will be more specifically explained with reference to FIG. 3A. FIG. 3A is a diagram illustrating a monitoring-system switching sequence at the time of program shifting.

As illustrated in FIG. 3A, in the ECU 10 according to the present embodiment, when the update-request receiving unit 111b performs "updating request reception", the monitoring-system switch requesting unit 111c transmits, to the power supply IC 12, a monitoring-system switching request just after reception of a first question after the updating request reception.

Thus, it is possible to confirm, by the reception of the question, that communication with the power supply IC 12 is established, furthermore eliminate a time lag in operating and transmitting by using the serial communication an answer to the question, and rapidly transmit a monitoring-system switching request to the power supply IC 12.

As illustrated in FIG. 3A, in the ECU 10 according to the present embodiment, a WDC signal is pulse-output at least once before the microcomputer 11 is "soft-reset" after transmitting a monitoring-system switching request. This point will be mentioned later more specifically with reference to FIG. 3C.

Thus, it is possible to prevent a hard reset to be performed by the power supply IC 12 that is due to an output delay of a WDC signal during "soft-reset", in other words, during a reboot period of the microcomputer 11 in program shifting.

As illustrated in FIG. 3A, microcomputer monitoring is continued by using the switched WDC monitoring system during a period until "program updating process completion", and the power supply IC 12 performs a hard reset after the "program updating process completion" so as to cause the microcomputer 11 to read and execute the updated control program 112c.

Returning to FIG. 2, the monitoring-system switch requesting unit 111c transmits a monitoring-system switching request to the power supply IC 12, and then informs the soft-reset processing unit 111d of this fact.

The soft-reset processing unit 111d soft-resets the microcomputer 11 after informing from the monitoring-system switch requesting unit 111c and after starting to output a WDC signal. The soft-reset processing unit 111d writes the soft-reset history 112b at the time of the soft reset.

When the microcomputer 11 is rebooted, the start determining unit 111e executes a start determining process for determining a program to be started on the basis of the update requesting information 112a and the soft-reset history 112b.

As described above, each of the update requesting information 112a and the soft-reset history 112b is stored in a corresponding storage area that is able to hold information as long as a device power source is held, and thus a risk is small in which the information includes an incorrect value due to RAM garbling etc. that can occur in a common RAM area etc.

Therefore, it is possible to start the updating program only when a correct procedure is undergone and the soft reset is performed by executing the start determining process on the basis of this update requesting information 112a and the soft-reset history 112b. In other words, it is possible to prevent an erroneous start of the updating program caused by an event, such as RAM garbling, and an improper soft reset.

Specifically, in a case where the microcomputer 11 is soft-reset, the start determining unit 111e determines that the updating program 112d is a program to be started only when the update requesting information 112a is "present" and further the soft-reset history 112b is "present".

That the update requesting information 112a is "present" indicates the fact that information indicating performance of an updating request reception is included in the update requesting information 112a. That the soft-reset history 112b is "present" indicates the fact that information indicating performance of a soft reset is included in the soft-reset history 112b.

When the microcomputer 11 is hard-reset, the start determining unit 111e determines that the control program 112c is a program to be started, regardless of a content of information included in the update requesting information 112a and the soft-reset history 112b.

The start determining unit 111e informs, as a start instruction, the program executing unit 111a of, for example, a type of the program that is determined to be started, and causes the program executing unit 111a to execute a program according to the start instruction.

Figure 3B:
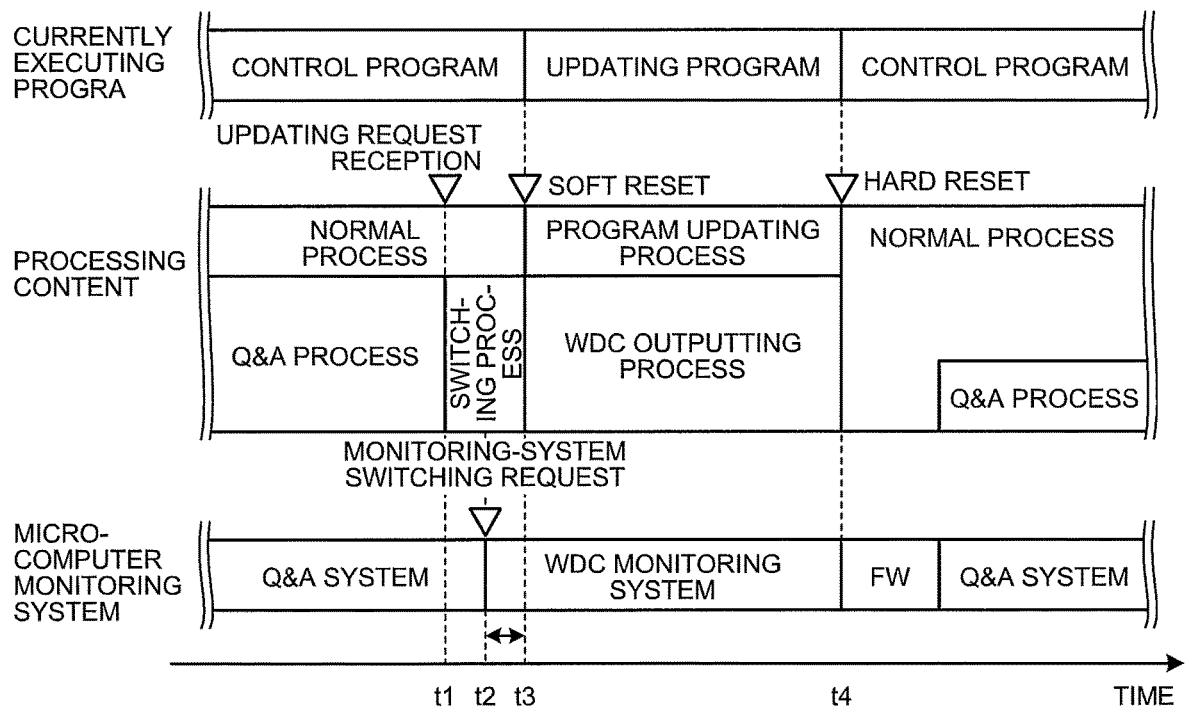
FIG. 3B is a diagram illustrating a processing sequence of the control program updating method according to the embodiment.
Figure 3C:
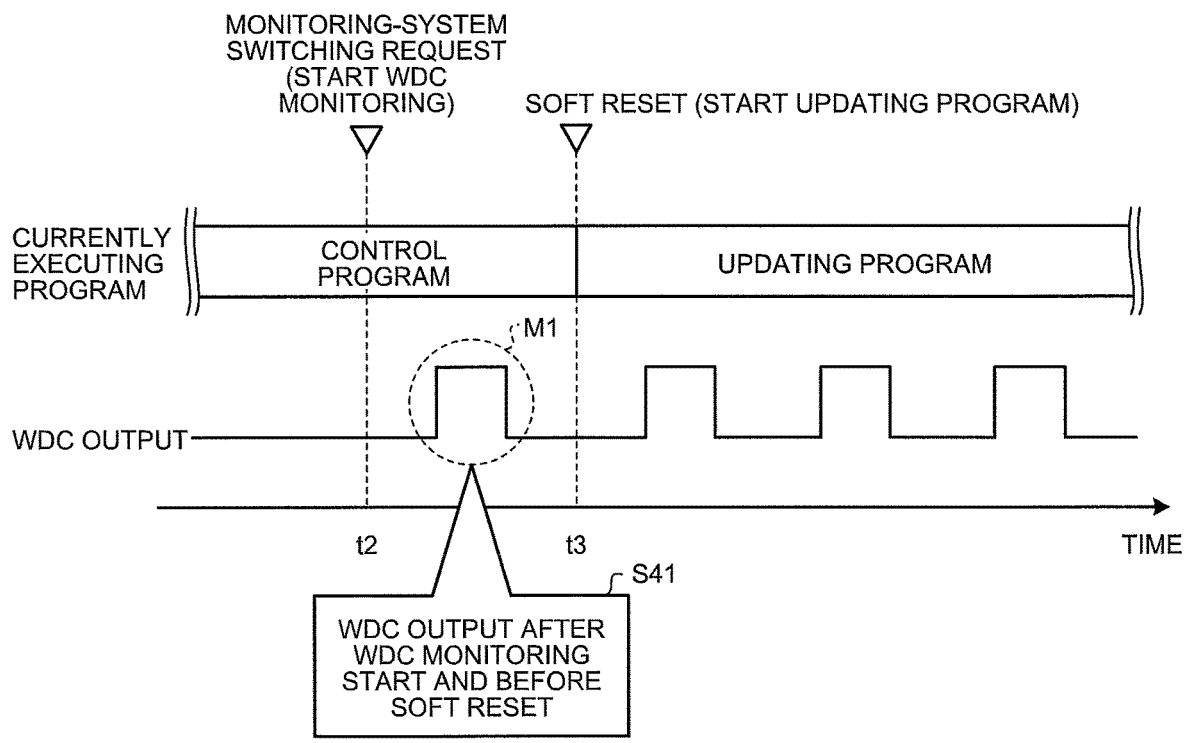
FIG. 3C is a diagram illustrating a more specific processing sequence between time points t2 and t3 illustrated in FIG. 3B.

On the basis of the above explanation, next, a procedure for processes in the control program updating method according to the present embodiment will be explained with reference to FIGS. 3B and 3C. FIG. 3B is a diagram illustrating a processing sequence of the control program updating method according to the present embodiment. FIG. 3C is a diagram illustrating a more specific processing sequence between time points t2 and t3 illustrated in FIG. 3B.

As illustrated in FIG. 3B, first, before a time point t1, it is assumed that "currently executing program" is the control program 112c, "processing content" includes a normal process and a Q&A process, and "microcomputer monitoring system" is a Q&A system.

It is assumed that "updating request reception" is performed at the time point t1. A process associated with switching between the microcomputer monitoring systems is executed during a period from this time point t1 to the time point t3 at which the microcomputer 11 is "soft-reset". As illustrated in FIG. 3B, for convenience of explanation, this process is referred to as "switching process".

In the switching process, at the time point t2 prior to the time point t3 of "soft reset", "monitoring-system switching request" is transmitted to the power supply IC 12, and the power supply IC 12 having received this "monitoring-system switching request" switches the microcomputer monitoring system into the WDC monitoring system.

In the switching process, a WDC signal is pulse-output at least once after the microcomputer monitoring system is switched into the WDC monitoring system and the WDC monitoring is started and before "soft-reset", namely, in a period between the time points t2 to t3.

The specific processing sequence between the time points t2 and t3, which is illustrated in FIG. 3B by using a double-headed arrow, is illustrated in FIG. 3C. In other words, as indicated by a part M1 in FIG. 3C, in the switching process, the control program 112c, which is "currently executing program", forcibly inverts a WDC signal after the WDC monitoring start at the time point t2 and before "soft-reset" at the time point t3, and pulse-outputs a WDC signal (Step S41).

Thus, it is possible to prevent a hard-reset to be performed by the power source IC 12, which is due to an output delay of a WDC signal during "soft-reset", in other words, during a reboot period of the microcomputer 11 in program shifting.

The case is exemplified in which the control program 112c forcibly outputs a WDC signal once before "soft-reset", however, the WDC signal may be output twice or more in accordance with the length between the time points t2 and t3 or a defined interval between pulses in the WDC monitoring system.

It is preferable that, when the updating program 112d is started after the "soft-reset", a WDC signal is periodically output just after the start. Thus, it is possible to prevent an interval between pulses of a WDC signal from extending before and after the soft reset. In other words, it is possible to contribute to prevent a hard reset to be performed by the power supply IC 12.

Returning to FIG. 3B, the microcomputer 11 is "soft-reset" at the time point t3. Next, when a start determination of a program, which is to be started in association with the reboot of the microcomputer 11, is performed and a starting condition of the updating program 112d is satisfied, the updating program 112d is started and "currently executing program" becomes the updating program 112d, and "processing content" comes to include a program updating process and a WDC outputting process.

When the program updating process is completed, "hard reset" is performed at a time point t4 by power supplying control of the power supply IC 12, the control program 112c is started in accordance therewith, and the control program 112c becomes "currently executing program" thereafter.

A period after "hard reset", which is complementarily illustrated, is one that is referred to as "First Window (FW)". In a predetermined time interval during this "FW", when the serial communication of the Q&A system is not started or a WDC signal of the WDC monitoring system is not input, the power supply IC 12 resets the microcomputer 11.

Next, a procedure for processes to be executed by the microcomputer 11 of the ECU 10 according to the present embodiment will be explained with reference to FIG. 4. FIG. 4 is a flowchart illustrating a procedure for processes to be executed by the microcomputer 11 of the ECU 10 according to the present embodiment.

Herein, a procedure for processes is illustrated, which are up to the start determining process after the soft reset in a case where an updating request from the updating terminal 50 is received. As a premise, it is assumed that the program executing unit 111a is in executing the control program 112c and the microcomputer monitoring system is the Q&A system.

Figure 4:
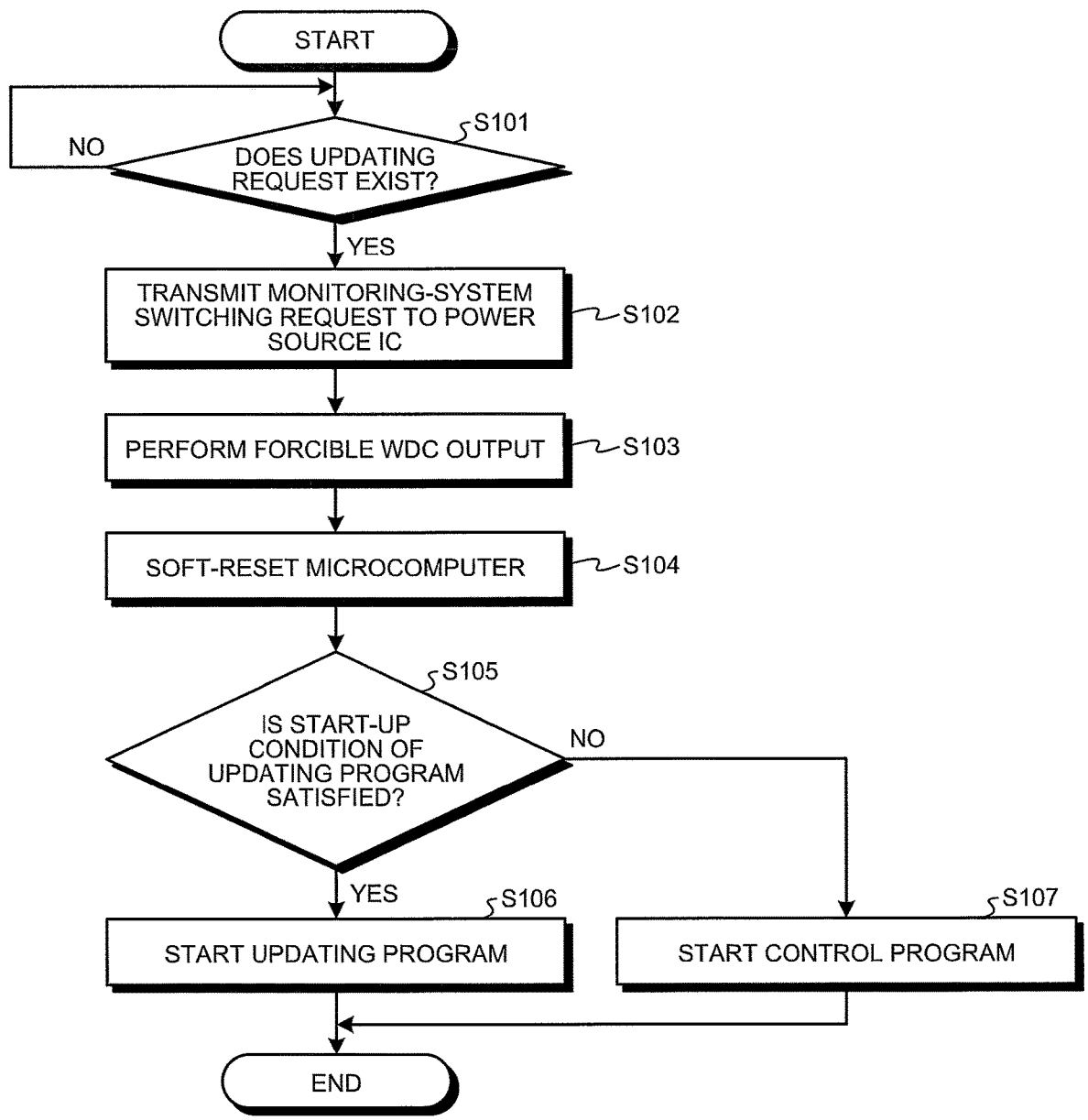
FIG. 4 is a flowchart illustrating a procedure for processes to be executed by a microcomputer of the ECU according to the embodiment.

As illustrated in FIG. 4, the update-request receiving unit 111b first determines whether or not there exists an updating request from the updating terminal 50 (Step S101). When there exists an updating request (Step S101: Yes), the update-request receiving unit 111b receives this updating request and writes the update requesting information 112a indicating that an updating request reception is performed (not illustrated), and then the monitoring-system switch requesting unit 111c transmits, to the power source IC 12, a monitoring-system switching request before a soft reset (Step S102).

When receiving the monitoring-system switching request, the power source IC 12 switches a microcomputer monitoring system from a Q&A system into a WDC monitoring system. When there exists no updating request (Step S101: No), the processes from Step S101 are repeatedly executed.

The program executing unit 111a performs, in the switching process, forcible WDC output after a WDC monitoring start and before the soft reset (Step S103).

The soft-reset processing unit 111d soft-resets the microcomputer 11 while leaving the soft-reset history 112b (Step S104).

After a reboot caused by the soft reset of the microcomputer 11, the start determining unit 111e determines whether or not a starting condition of the updating program 112d is satisfied (Step S105). When the determination condition of Step S105 is satisfied (Step S105: Yes), the start determining unit 111e causes the program executing unit 111a to start the updating program 112d (Step S106).

On the other hand, the determination condition of Step S105 is not satisfied (Step S105: No), the start determining unit 111e causes the program executing unit 111a to start the control program 112c (Step S107). Hereby, the procedure for processes up to the start determining process is completed.

As described above, the ECU 10 (corresponding to one example of "controller") according to the present embodiment includes the microcomputer 11 (corresponding to one example of "main processing unit") and the power source IC 12 (corresponding to one example of "monitoring unit").

The microcomputer 11 executes the control program 112c. The power source IC 12 monitors the microcomputer 11 by a Q&A system (corresponding to one example of "first monitoring method") for transmitting, to the microcomputer 11, a transmission content corresponding to a question and for evaluating an answer to the question from the microcomputer 11.

The microcomputer 11 causes, when receiving an updating request of the control program 112c, the power source IC 12 to perform switching from the Q&A system into a WDC monitoring system (corresponding to one example of "second monitoring method") for monitoring a WDC signal (corresponding to one example of "watchdog signal") of the microcomputer 11.

Therefore, by employing the ECU 10 according to the present embodiment, it is possible to prevent an erroneous reset by the power source IC 12 at the time of updating the control program 112c.

The microcomputer 11 shifts, when receiving the updating request of the control program 112c, to program shifting that starts, instead of the control program 112c, the updating program 112d for updating the control program 112c. The program shifting includes a soft reset (corresponding to one example of "restart in state where device power source is held") of the microcomputer 11. The microcomputer 11 causes, at the time of the program shifting and before the soft reset, the power source IC 12 to perform the switching from the Q&A system into the WDC monitoring system.

In other words, the ECU 10 according to the present embodiment switches the microcomputer monitoring system into the WDC monitoring system that is defined more loosely than the Q&A system and whose communication sequence is simple and not likely to be disturbed, before the soft reset, not after the soft reset when a heavy processing load is inclined to be burdened and the disturbance in a communication timing is assumed to easily occur.

Thus, by employing the ECU 10 according to the present embodiment, it is possible to reduce a risk in which the power supply IC 12 determines an operation abnormality during program shifting and to prevent a hard reset performed by the power supply IC 12 during program shifting.

The microcomputer 11 forcibly outputs, to the power source IC 12, the WDC signal at least once after a start of monitoring by the WDC monitoring system and before the soft reset.

Thus, by employing the ECU 10 according to the present embodiment, it is possible to prevent a hard reset to be performed by the power source IC 12, which is due to an output delay of a WDC signal during the soft reset, in other words, during a reboot period of the microcomputer 11 in program shifting.

The microcomputer 11 periodically outputs the WDC signal just after the updating program 112d is started through the soft reset.

Thus, it is possible to prevent an interval between pulses of a WDC signal from extending before and after the soft reset. In other words, it is possible to contribute to prevent a hard reset to be performed by the power supply IC 12.

Note that, in the above embodiment, the update requesting information 112a is stored in the retention RAM area, and the soft-reset history 112b is stored in the register. However, it is sufficient that the storage is configured to be able to hold information as long as the device power source is held, and thus it is not intended that the storage destinations of the update requesting information 112a and the soft-reset history 112b be limited.

In the above embodiment, the ECU 10 is provided in the vehicle C, it is needless to say that the ECU 10 may be provided in, for example, a ship, an airplane, etc. not limited to the vehicle C.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A controller comprising:

a main processing unit that executes a control program; and a monitoring unit that switches a monitoring method between a first monitoring method and a second monitoring method to monitor the main processing unit where the monitoring unit transmits, in the first monitoring method, a question to evaluate an answer from the main processing unit in response to the question, and monitors, in the second monitoring method, a watchdog signal periodically transmitted from the main processing unit, wherein the monitoring unit monitors the main processing unit in the first monitoring method during execution of the control program, and when the main processing unit receives an updating request of the control program, the monitoring unit switches a monitoring method from the first monitoring method into the second monitoring method to monitor the main processing unit.

2. The controller according to claim 1, wherein when receiving the updating request of the control program, the main processing unit executes program shifting that starts, instead of the control program, an updating program for updating the control program, the program shifting includes a restart of the main processing unit while keeping a power of the controller turned-on, and at a time of the program shifting and before the restart, the monitoring unit switches a monitoring method from the first monitoring method into the second monitoring method.

3. The controller according to claim 2, wherein the main processing unit forcibly outputs, to the monitoring unit, the watchdog signal at least once after a start of monitoring by the second monitoring method and before the restart.

4. The controller according to claim 2, wherein the main processing unit periodically outputs the watchdog signal just after the updating program is started through the restart.

5. The controller according to claim 3, wherein the main processing unit periodically outputs the watchdog signal just after the updating program is started through the restart.

6. A control program updating method to be performed by a controller, the controller including:

a main processing unit that executes a control program; and a monitoring unit that switches a monitoring method between a first monitoring method and a second monitoring method to monitor the main processing unit where the monitoring unit transmits, in the first monitoring method, a question to evaluate an answer from the main processing unit in response to the question, and monitors, in the second monitoring method, a watching signal periodically transmitted from the main processing unit, and the control program updating method comprising:

causing the monitoring unit to monitor the main processing unit in the first monitoring method during execution of the control program; and causing, when the main processing unit receives an updating request of the control program, the monitoring unit to switch a monitoring method from the first monitoring method into the second monitoring method to monitor the main processing unit.

* * * * *